(12) United States Patent
Wilkins et al.

(10) Patent No.: US 9,715,261 B2
(45) Date of Patent: Jul. 25, 2017

(54) CONTINUOUS DYNAMIC BALANCING OF GENERATION AND LOADS

(71) Applicant: Power Quality Renaissance, LLC, Henderson, NV (US)

(72) Inventors: Thomas Alexander Wilkins, Henderson, NV (US); Charles Grunewald, Ottertail, MN (US)

(73) Assignees: Thomas Wilkins, Henderson, NV (US); Charles Grunewald, Ottertail, MN (US)

( * ) Notice: Subject to any disclaimer, the term of this patent is extended or adjusted under 35 U.S.C. 154(b) by 769 days.

(21) Appl. No.: 13/780,164

(22) Filed: Feb. 28, 2013

(65) Prior Publication Data

US 2013/0226360 A1 Aug. 29, 2013

Related U.S. Application Data

(60) Provisional application No. 61/604,707, filed on Feb. 29, 2012.

(51) Int. Cl.
*G06F 1/26* (2006.01)
*H02J 3/06* (2006.01)
*H02J 3/14* (2006.01)
*H02J 3/00* (2006.01)

(52) U.S. Cl.
CPC ............ *G06F 1/26* (2013.01); *H02J 3/06* (2013.01); *H02J 3/14* (2013.01); *H02J 2003/003* (2013.01); *Y02B 70/3225* (2013.01); *Y04S 10/54* (2013.01); *Y04S 20/222* (2013.01)

(58) Field of Classification Search
None
See application file for complete search history.

(56) References Cited

U.S. PATENT DOCUMENTS 7,095,597 B1 * 8/2006 Cousineau ............ H02J 3/1828
361/20
8,180,499 B2 * 5/2012 Kanai ....................... H02J 3/14
700/287

(Continued)

OTHER PUBLICATIONS

Vasquez, J.C.; Guerrero, J.M.; Miret, J.; Castilla, M.; de Vicuña, L.G., "Hierarchical Control of Intelligent Microgrids," in Industrial Electronics Magazine, IEEE , vol. 4, No. 4, pp. 23-29, Dec. 2010.*

(Continued)

*Primary Examiner* — Christopher E Everett (57) ABSTRACT

Methods and apparatus for dynamically balancing at least one load characterized by an associated energy reservoir with at least one renewable energy source where both the load and the renewable energy source coupled to a power transmission system. A central controller regulates energy delivery to one or more loads over the power transmission system by anticipating energy demand over an interval of time, accounting for the status of the associated energy reservoir. Each load is linked with at least one renewable energy source. The anticipated energy demand is synchronized with delivery of energy by the renewable energy source by commands delivered to a local switching and monitoring device coupled to the load and subject to override by a local user.

13 Claims, 6 Drawing Sheets

(56) References Cited

U.S. PATENT DOCUMENTS

| | | | | |
|---|---|---|---|---|
| 8,364,287 | B2* | 1/2013 | Pearson | H01M 8/04619 320/101 |
| 8,457,802 | B1* | 6/2013 | Steven | G06Q 10/00 700/291 |
| 2007/0100503 | A1* | 5/2007 | Balan | H02J 3/383 700/286 |
| 2007/0138792 | A1* | 6/2007 | Liu | H02J 4/00 290/1 A |
| 2009/0105888 | A1* | 4/2009 | Flohr | G06Q 30/00 700/295 |
| 2009/0216387 | A1* | 8/2009 | Klein | H02J 3/14 700/296 |
| 2009/0326729 | A1* | 12/2009 | Hakim | H02J 3/32 700/295 |
| 2010/0138062 | A1* | 6/2010 | Zheng | C10G 1/10 700/291 |
| 2010/0179705 | A1* | 7/2010 | Flohr | F24H 9/2021 700/295 |
| 2010/0314942 | A1* | 12/2010 | Talkin | G06Q 50/06 307/41 |
| 2011/0029141 | A1* | 2/2011 | Sun | H02J 3/00 700/291 |
| 2011/0257803 | A1* | 10/2011 | Yamamoto | G06F 1/263 700/291 |
| 2012/0065792 | A1* | 3/2012 | Yonezawa | H02J 3/14 700/291 |
| 2012/0065801 | A1* | 3/2012 | Rossi | G06F 1/263 700/295 |
| 2012/0086273 | A1* | 4/2012 | Rognli | H02J 3/14 307/43 |
| 2012/0089256 | A1* | 4/2012 | Marchitto | F03D 9/00 700/276 |
| 2012/0179301 | A1* | 7/2012 | Aivaliotis | H02J 3/00 700/286 |
| 2013/0030590 | A1* | 1/2013 | Prosser | H02J 3/14 700/295 |
| 2013/0038122 | A1* | 2/2013 | Broniak | H02J 4/00 307/18 |
| 2013/0096728 | A1* | 4/2013 | Steffes | H02J 3/14 700/291 |
| 2013/0134962 | A1* | 5/2013 | Kamel | G01R 21/1333 324/103 R |

OTHER PUBLICATIONS

Grunewald, Charles and Wilkins, Thomas A., Renaissance Energy LLC: Proposal to Xcel Category B RDF and Business Development Plan, 2001, 29 pages.

Mustaphi et al., "Dynamically Balanced Delivery of Wind Generation to Displace Use of Non-renewable Fuel," 2004, 29 pages.

Invest Ottawa, "Energate connects energy conservation with consumer comfort and convenience," 2012, 2 pages.

St. John, Jeff, "Water Heaters for Wind Energy Storage," Greentech Media, http://www.greentechmedia.com/articles/read/water-heaters-forwind-energy-storage, Dec. 7, 2009, 4 pages.

Mustaphi, Kalyan et al., Xcel Energy RDF Proposal, Excel Engineering, Inc. R&D Proposal to Increase Wind Generation and Renewable Energy Use on Nodal Basis With Existing Transmission, Mar. 16, 2004, 24 pages.

* cited by examiner

CONTINUOUS DYNAMIC BALANCING OF GENERATION AND LOADS

The present application claims the priority of U.S. Provisional Patent Application Ser. No. 61/604,707, filed Feb. 29, 2012, and incorporated herein by reference. It may be referred to herein as the "'707 Provisional."

TECHNICAL FIELD

The present invention relates generally to a continuous dynamic balance of generation and loads for dynamically scheduling volatile power sources in coordination with select customer loads with thermal inertial storage and interruptible load capability for both intrazonal and interzonal control.

BACKGROUND ART

The only methods known in the art, prior to the current invention, for balancing generation capability and load demands on a power network were based on real-time measurements (on both the generating and demand sides of the network) and failed to account for different categories of energy sources. There had never been any suggestion of balancing VG generation capability and SI load demand on either an intrazonal or interzonal basis prior to the provisional patent application from which the present application claims priority.

Available methods lack any wherewithal for balancing storage and interruptible loads with changes in volatile generation. Moreover, methods for balancing generation capability and load demand have been deemed to be applicable only on a system-wide control area basis.

It was known that a power utility might be able to manage consumer demand to some extent by remote regulation of certain appliances and other demands for energy, and that input from the consumer, concerning ambient temperature in the consumer's home, for example, might be considered in this management process. An example of a product that provides for communication between a utility provider and a consumer is the Consumer Connected Demand Response™ device, available from Energate, Inc. of Ottawa, Calif.

The use of water heaters for storage of wind-generated energy had already been suggested, as described, for example, by St. John, *Water Heaters for Wind Energy Storage, Greentech Media*, (http://www.greentechmedia.com/articles/read/water-heaters-for-wind-energy-storage) (2009), which is incorporated herein by reference.

Proposals submitted to the Northern States Power Company in 2001 and to the Renewable Development Fund in 2004 by the current inventors laid out a system of dynamically balancing VG and SI loads transparent to the transmission grid (TG) while also providing power transmission ancillary control services (frequency, area control area (ACE), cross trip and load following) plus the idea of a local switching and monitoring devices for residual storage feedback.

SUMMARY OF EMBODIMENTS OF THE INVENTION

In accordance with various embodiments of the present invention, a system and methods are provided for balancing at least one load with at least one renewable energy source, where both are coupled to a power transmission system. The load has an associated energy reservoir. A method in accordance with the invention has steps of:

a. providing a central controller for regulating energy delivery to the at least one load over the power transmission system;
b. anticipating an energy demand for the at least one load over an interval of time, accounting for a status of the associated energy reservoir;
c. linking each load with at least one of the at least one renewable energy source; and
d. synchronizing the anticipated energy demand for the at least one load with delivery of energy by the at least one renewable energy source by commands delivered to a local switching and monitoring device coupled to the at least one load and subject to override by a local user.

In alternate embodiments, the interval of time may include future time or past time. Energy may be delivered for storage at the at least one load in anticipation of a period of demand at the load.

In other embodiments of the invention, the step of assessing energy demands may include calculating a heat load schedule based on anticipated ambient temperatures. It may also include utilizing a forecast model, such as a forecast model including estimates of utility pricing or environmental burden.

In further embodiments of the invention, methods may also include altering traveling wave speed, traveling wave phase, or traveling wave magnitude, or any combination of the foregoing, on a power system.

In yet further embodiments of the invention, reactive lumped or distributed parameters may be adjusted in such a manner as to alter traveling wave speed, phase or magnitude on a power system. Additionally, two separate power systems may be interconnected.

In an additional embodiment of the invention, a method is provided for insulating an interconnection coupling two power zones from variations in generating capacity or load by dynamically matching load to a volatile generating source.

In accordance with an alternate aspect of the present invention, a system is provided for delivering energy to at least one load from a non-renewable energy source and a renewable energy source. Both the renewable and non-renewable sources are coupled to the load through a power transmission grid. The system has a central controller coupled to the (at least one) load, where the central controller is adapted to assess energy demands for each load over an interval of time and to synchronize the energy demands with delivery of energy by the at least one renewable energy source. The system also has a local switching and monitoring device coupled to the load for receiving switching commands from the central controller and subject to override by a local user.

BRIEF DESCRIPTION OF THE DRAWINGS

The foregoing features of the invention will be more readily understood by reference to the following detailed description, taken with reference to the accompanying drawings, in which.

DESCRIPTION OF SPECIFIC EMBODIMENTS OF THE INVENTION

Definitions

In the present description, and in any appended claims, the term "energy demand," unless otherwise specified in context, shall encompass both electrical and non-electrical energy needs of a load, including needs, for example, of heating or cooling living spaces or water.

In the present description, and in any appended claims, the term "energy reservoir" shall refer, without limitation, to any modality, whatsoever, for storing energy in any form, kinetic or potential. Thus, for example, creating a temperature differential which may, at some future time, be used for extraction of energy, constitutes establishing an energy reservoir.

The term "associated energy reservoir" shall indicate that the energy reservoir, as previously defined, shall be located on the load side of a power transmission system, if the energy reservoir is associated with a load, and on a source side of a power transmission system, if the energy reservoir is associated with a source.

The word "load," as used herein, unless the context requires otherwise, shall apply to a device that consumes energy, whether electrical or otherwise, and shall apply to such a device at all levels of granularity. Thus, for example, a town may constitute a load for an electric transmission network, as may a factory or a home, or an appliance within either. The location where energy is consumed, such as the home of a utility customer, may also be referred to herein, as a "load," for convenience of expression.

The term "linking" shall mean providing for potential connectivity of at least one energy source and at least one energy load, though it is to be understood that the value of the present invention lies in the potential, in accordance with present teachings, to allocate energy provided by multiple energy sources among multiple energy loads of varying kinds and demands.

In the present description, and in any appended claims, the term "synchronizing" shall mean allocating power delivery to one or more specified loads with respect to time and quantity of power to be delivered.

The term "local switching and monitoring device," as used herein and in any appended claims, shall mean any remotely controlled device that monitors one or more parameters indicative of power being applied at a load and additionally switches power to an energy reservoir at the load at one or multi-mode levels, including such devices that allow for multiple set points, some of which may be set by a customer, as described in par. [0046] below.

The term "zone," to which the adjectives "interzonal" and "intrazonal" refer, shall denote a geographic area within which a single entity, (such as an Independent System Operator (ISO), a Regional Transmission Organization (RTO), or any other entity) balances generation and loads in real time to maintain reliable operation. Zones may be linked with each other through transmission interconnection tie lines, etc.

A "global power system," or, equivalently, a "universal power system" shall be defined as a power system interconnected to one or more electrical, thermal, mechanical, or chemical power sources or power sinks capable of receiving, delivering and conveying energy in one or more forms.

The term "dynamic brake," in the current context and as used herein, shall denote any system that effectively high speed switches on a predictable selected aggregated power load on demand so as to provide a supplier of power to a utility grid the opportunity to dispose of excess power and thereby protect systems from damage and failure.

Furthermore, a dynamic brake can act in conjunction with switching and variable capacitive, inductive or resistive source(s) or load(s) to modify the disruption caused by traveling waves created by the natural response of the power system, or control system dynamic responses, which appear and manifest as traveling waves on a power system or global power system. The dynamic brake can act to modify the traveling wave's wave velocity, wave phase or wave magnitude traveling on a power system or global power system.

This is accomplished using a synchronizing controller 120 (discussed below) that acts in conjunction with the power system and monitors the system for traveling waves and adjusts real and reactive components on the power system to adjust the wave properties. For example, the wave speed is determined by the product of the distributed mass (inductive) and spring constant (capacitive) parameters on the power system. By adjusting these by switching capacitors or inductors in or out, the value is changed and the speed changes. This can also change the phase of the wave a particular point. Next, the load can be increased to dampen the magnitude of the wave so it is less disruptive. Last, the traveling waves in conjunction with control system response of the traveling wave modification, in accordance with the invention as taught herein, can create a buffer between two separate power systems and can allow them to be interconnected and stable by measuring the traveling waves in both, adjusting their magnitude, phase, and wave speed to where they interfere with each other, and to where they reduce their disruptive impact on both power systems.

A "traveling wave," for purposes of the present description, shall be defined as a disruption in either voltage or current or real power or reactive power caused by an input to a dynamic system and the natural or general response of that dynamic system. Where the dynamic system has mass or inductive, spring or capacitive and dashpot or resistive characteristics which are distributed. The term traveling wave also encompasses one or more control system responses input into the power system where the control systems response in conjunction with the natural response of the power system creates an appearance of a traveling wave on the power system.

Sources of electrical shall be referred to as "volatile" when their output cannot be accurately predicted on an hour-to-hour basis, as when their output depends on wind or solar conditions at the site of power generation.

"Curtailment" refers, in the context of a volatile energy source, to the temporary discontinuation of an available energy source, such as the power generation of a wind turbine, in order to mitigate issues such as those associated with turbine loading, or energy demand on the grid, or poorly planned allocation of generating capacity among renewable and non-renewable sources.

As used herein and in any appended claims, the term "coupled" shall indicate that two or more components bear a relationship to one another such that force, energy, or information may be transmitted from one to another, whether via direct contact or radiatively or via some telemetric intermediation, including, without limitation, cable, radio, WiFi, or the internet.

The term "local user" shall refer to an energy customer associated with a particular load on a power network.

Embodiments of the present invention are now described with reference to FIGS. 1-8, wherein similar reference characters denote similar elements throughout the several views. First, an overview of a dynamic power grid balancing system in accordance with an embodiment of the present invention, designated generally by numeral 99, is described with reference to FIG. 1. Transmission and distribution system 100 may be referred to herein using general terms such as "power system," "system," "grid," or any other terms known to persons of ordinary skill in the art to denote the same general concept. Electrical power is transmitted from a set of sources 102 to a set of loads 104 according to the teachings provided herein.

Figure 1:
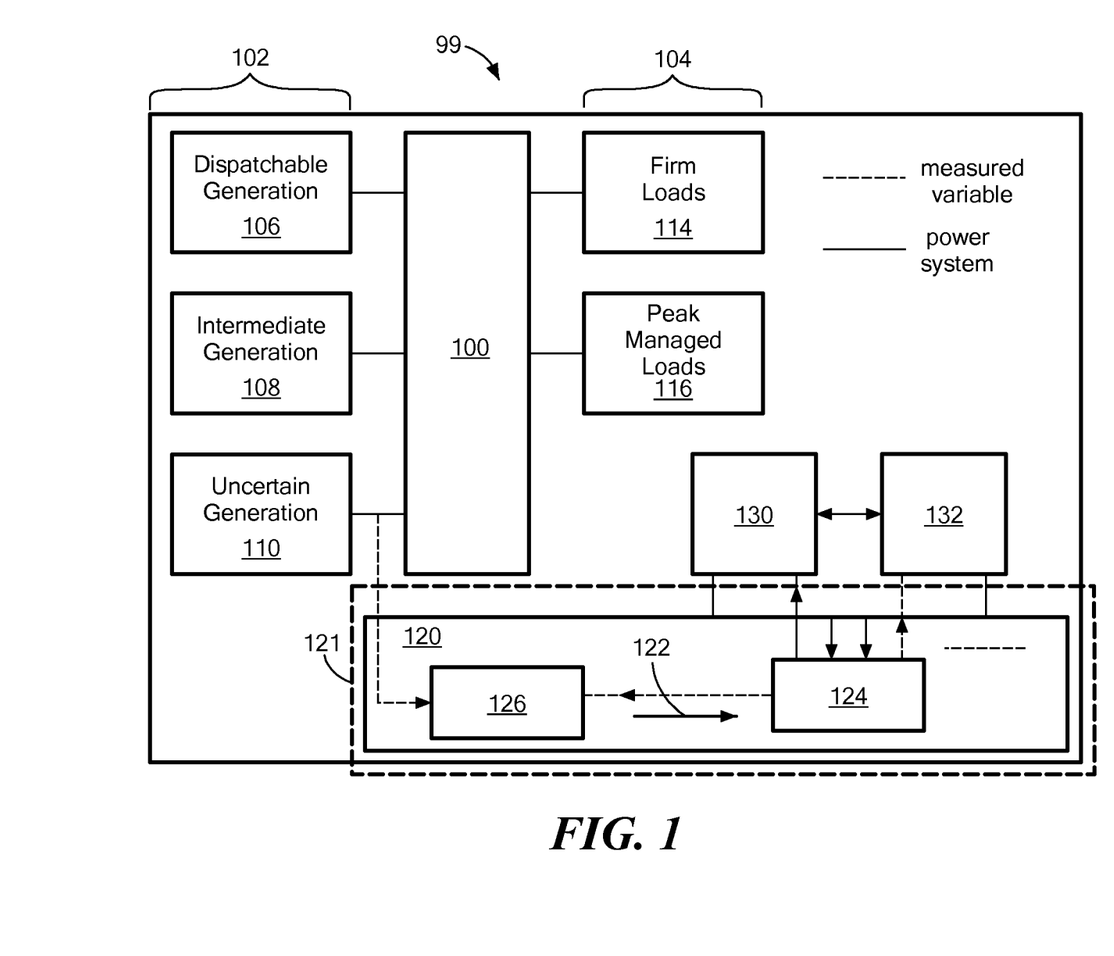
FIG. 1 shows a schematic overview of a dynamic power grid balancing system in accordance with an embodiment of the present invention.

Sources 102 within system 100 may be grouped into three general categories: Dispatchable Generation 106, Intermediate Generation 108, and Uncertain Generation 110, all of which are connected to the Transmission and Distribution System 100. Dispatchable Generation 106, refers to sources of electrical generation that are capable of being dispatched on demand, at the request of a power grid operator. Uncertain Generation 110 encompasses solar, wind, or other volatile sources of generation, as defined above. Finally, Intermediate Generation 108 is typically made up of smaller load-following power plants, such as natural gas plants, etc. These plants produce must of their power during the day, when demand and power costs are highest.

On the load 104 side of transmission and distribution system 100 are loads 104 that may, in turn, be categorized as Firm Loads 114, Peak Managed Loads 116, and Matching Loads 118. Firm Loads 114 are served 100% of the time and are guaranteed. Peak Managed Loads 116 denote loads where the maximum load in a defined period of time has occurred on the transmission and distribution system 100. Matching Loads 118 are "hybrid" in nature, which term is defined herein to refer to the capacity of such loads to use electricity, primary fuels, and/or other nonrenewable and renewable non-electrical sources of energy.

Matching Loads 118 are controlled from a Control Center 121 that contains a synchronizing controller 120. Synchronizing controller 120 receives measurements of the relationship of generation to power flows on the power system, and provides power regulation and balancing response on the power system. Details are provided herein as to how synchronizing controller 120 (also referred to herein as the "Central Controller," or as a controller) may be implemented in accordance with preferred embodiments of the invention. Bidirectional Load Side Communication System 122 conveys information and commands between a Source Balancing Center 126 and a Load Controller/Monitor 124. Source Balancing Center 126 receives near-real-time measurements of power being provided to the grid 100 $f$ by the Uncertain Generation sources 110, including volatile generating components like wind and solar generators. Source Balancing Center 126 may issue commands resulting in a scam shutoff of VG generating capacity under load conditions that so warrant.

Load Controller/Monitor 124 communicates telemetrically with local switching and monitoring devices 300 (shown in FIG. 3), which are discussed below. Load Controller/Monitor 124 thus acquires data as to power usage, current and anticipated, at the loads, and commands switching at the loads to accomplish thermal or other energy storage objectives. More particularly, synchronizing controller 120 may send information via Load Controller/Monitor 124 to turn SI loads (including individual appliances) on and off and adjust level of charge.

Bidirectional Load Side Communication System 122 communicates between Balancing Center 126 and load controller 124, which is equipped with meters with switches that select the loads and the selected energy source (either renewable or nonrenewable) is connected to the synchronizing controller 120. Controller module 130 matches Uncertain Generation 110 to a non-renewable load, a process otherwise referred to herein as "linking." Thus, certain elements of the load, such as home lighting, etc., cannot be deferred or stored, thus, during periods of demand of this kind of load, power must be made available, and it is to be supplied by renewable generation sources, to the extent possible. Controller module 132 attends to displacement of non-renewable fuels, to the extent of connected new fuel displacing storage or interruptible load. This is made possible by banking energy in energy reservoirs on the load end, and by allocating generation capacity among fuels and volatile sources. Controller module 134

Figure 2:
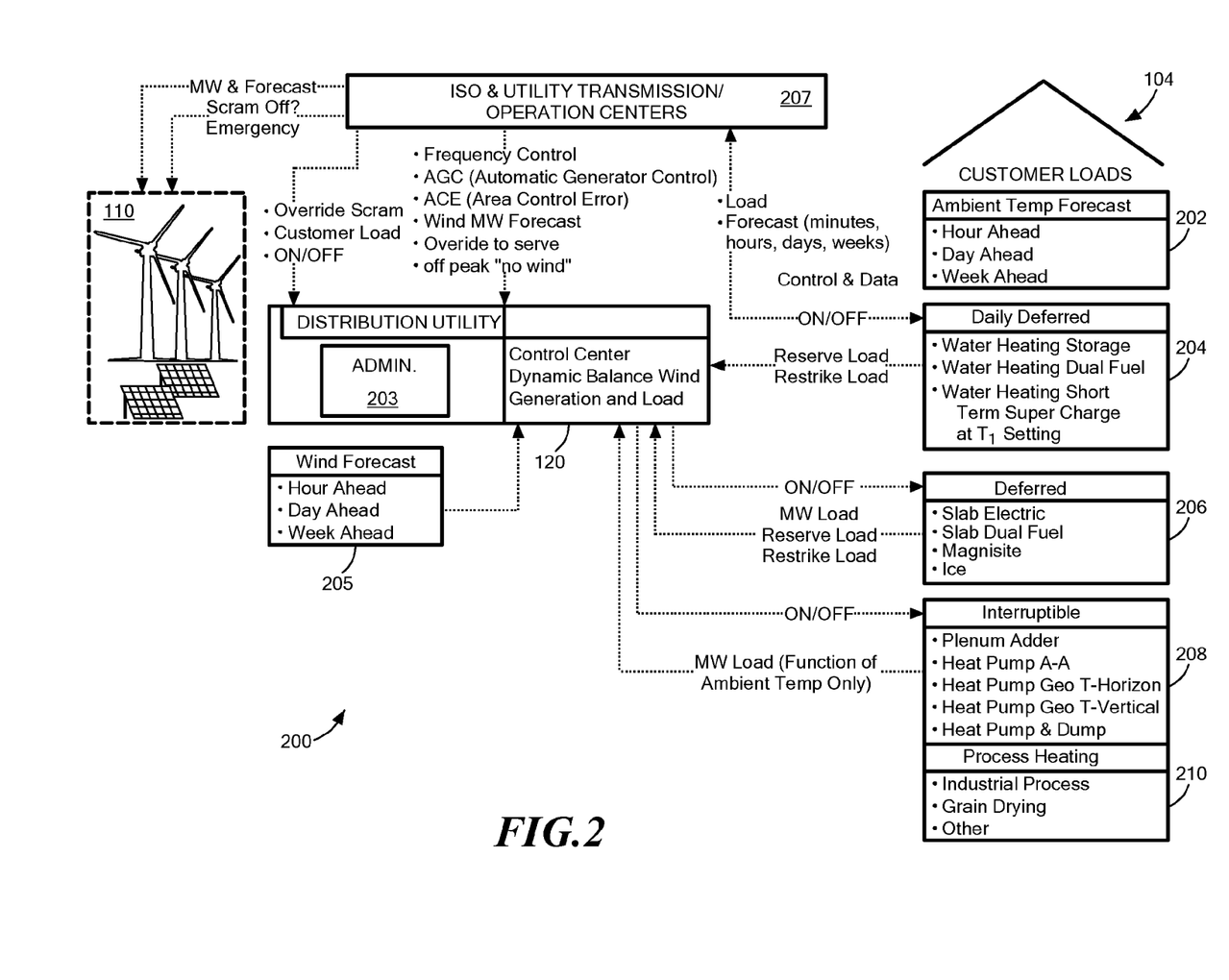
FIG. 2 shows a schematic overview of a dynamic power grid balancing system in accordance with a further embodiment of the present invention.

Another overall schematic of a dynamic power grid balancing system, designated generally by numeral 200, is now described with reference to FIG. 2. The interrelationship among various levels of such a system is depicted. At the highest level depicted are Utility Transmission/Operation Centers 207 of an Independent System Operator (ISO). The Utility Transmission/Operation Center 207 controls the availability of uncertain, or renewable, generation 110, and may initiate a curtailment or override scram shutoff of renewable generation in case of excess generation, weather conditions, or various emergency conditions. Utility Transmission/Operation Center 207 may call upon Dispatchable Generation capability, and, in particular, may override commands of Control Center 120.

Control Center 120, under auspices and administration of a Distribution Utility 203, governs the dynamic balancing of generation and loads provided in accordance with embodiments of the present invention. In particular, Control Center 120 receives inputs of forecasts 205 of wind and/or solar irradiance over future periods. Forecasts 205 may take into account past historical periods and patterns of use, and may employ forecast models and associated probabilities, thereby allowing for weighting of respective power allocation strategies. Forecasts 205 may account for relative fuel prices, $CO_2$ burden, fuel transportation constraints, etc.

Demands for power by loads 104 may be categorized for load synchronization purposes into the following categories:

Daily Deferred Loads 204 include energy demands for which energy may be built up and stored on a daily basis, although the stored energy is consumed within a day. These include water heating demands. Such demands may be anticipated, however, and water preheated during periods when volatile generating capacity is available and during non-peak periods when power is less costly. In particular, while water is typically used at a temperature, $T^2$ in the 120-130° F. range, water heating may be scheduled or instantaneously "supercharged" up to a hotter T1 temperature, typically in the range of 160-170° F. to ride through periods of limited VG, for dynamic brake or when excess renewable or low-cost generating capacity is available, as further described below.

Deferred Loads 206 may retain energy for periods of time, on the time scale of hours, days or a week. Thus, for example, energy may be stored by batteries, heating a slab of a house, or maintaining thermal gradients by heating water, magnesite or salts, or by making ice, in either case serving as an effective energy "battery" that may be treated as an effective "source" to be traded off against newly generated energy on the basis of considerations of efficiency, cost, environmental impact, etc.

Interruptible Loads 208 are loads that can be curtailed or suspended for varying periods of time at the discretion of central synchronization of sources and loads and made up at a later time or switched to alternative fuels.

Process Heating Loads 210 include significantly concentrated loads for industrial applications such as dual fueled-industrial steam, grain drying, etc. In some cases, periods of significant demand may time-shifted in order to optimally match source availability and other loads on the grid.

Forecasts 202 associated with particular loads—indicate prospective load demand over a future period, including forecast periods extending from minutes, to hours, to days. Such forecasts 202 consider ambient temperature of the air and ground, or predictable shifts in energy demand due to holidays, etc. Modalities for supplying forecasts 202 to central controller 120 may be collocated with individual customer load sites, however they may also be derived from a centralized resource such as a weather prediction service, etc., within the scope of the present invention.

A primary function of Central Controller 120 is to direct renewal generation 110 to SI loads thus displace fuels with VG sourced energy on the basis of cost and associated $CO_2$ reduction. Thus, if loads can be deferred until renewable generation becomes available, great cost efficiencies may be achieved. In particular, it may not be necessary for up or down swinging of base dispatch able generation nor intermediate generation sources 108 to match demands. Traditional Generation may continue to be scheduled on the basis of cost. VG to SI delivery may realize credits allocated to the reduction $CO_2$ emissions by the new fuel displacing SI customer uses.

By virtue of the functionality of Central Controller 120, it is to be appreciated that the distinctive designation of nodes on power transmission and distribution system 100 (shown in FIG. 1) as either sources or loads is somewhat arbitrary, since loads that have been supercharged to function as energy reservoirs may serve as "effective sources" during periods when generating capacity is directed elsewhere in the system.

Load control functionality at the load site or appliance level, in accordance with embodiments of the present invention, is now described with reference to FIG. 3. A load control circuit 302 controls a subsystem of a load, down to an appliance level, and is coupled to power transmission and distribution system 100 (shown in FIG. 1) at mains 304, with power consumption metered at meter 306. Control of power used for electrically heating waver in water heater 310 is shown here by way of example, and without limitation. Water heater 310 is regulated with respect to two water temperatures. One, lower, temperature, T2, is set, typically by a customer, by thermostat 322 and governs water temperature based on a temperature sensor 314. Analogous set points may be set for cooling devices. Based on a control signal received at terminal 308, local switching and monitoring device 300 may activate solid state relay 324 and bypass the T2-regulation circuit in order to inject more energy into water heater 310, limited, then, by thermostat 312 which is set to a higher temperature T1. Thus, in the case of excess power generation, central controller 120 can use the aggregate of a large number of customer loads to absorb excess generation capacity, and to store the energy as thermal inertia to offset demand during some future period of forecast demand. In accordance with embodiments of the present invention, control of one or mode load units may be overridden by a local user.

Terminal 308 couples local switching and monitoring device 300 bidirectionally to central controller 120 insofar as local switching and monitoring device 300 monitors local load parameters such as water, ambient and slab temperatures, and forwards them to central controller 120, via cable, telephone, radio, optical fiber, or any other means of conveying data. This allows the synchronization of power delivery to loads 104 to account for energy that is stored in energy reservoirs associated with each load. Similarly, central controller 120 commands the switching of power to loads or subloads at the consumer side of the grid.

Optionally, a further control circuit 320 with a switching capability, such as might be provided by a solid state relay 326, may be commanded by central controller 120 to curtail the supply of power altogether to one or more interruptible loads to mitigate peak demands.

Figure 3:
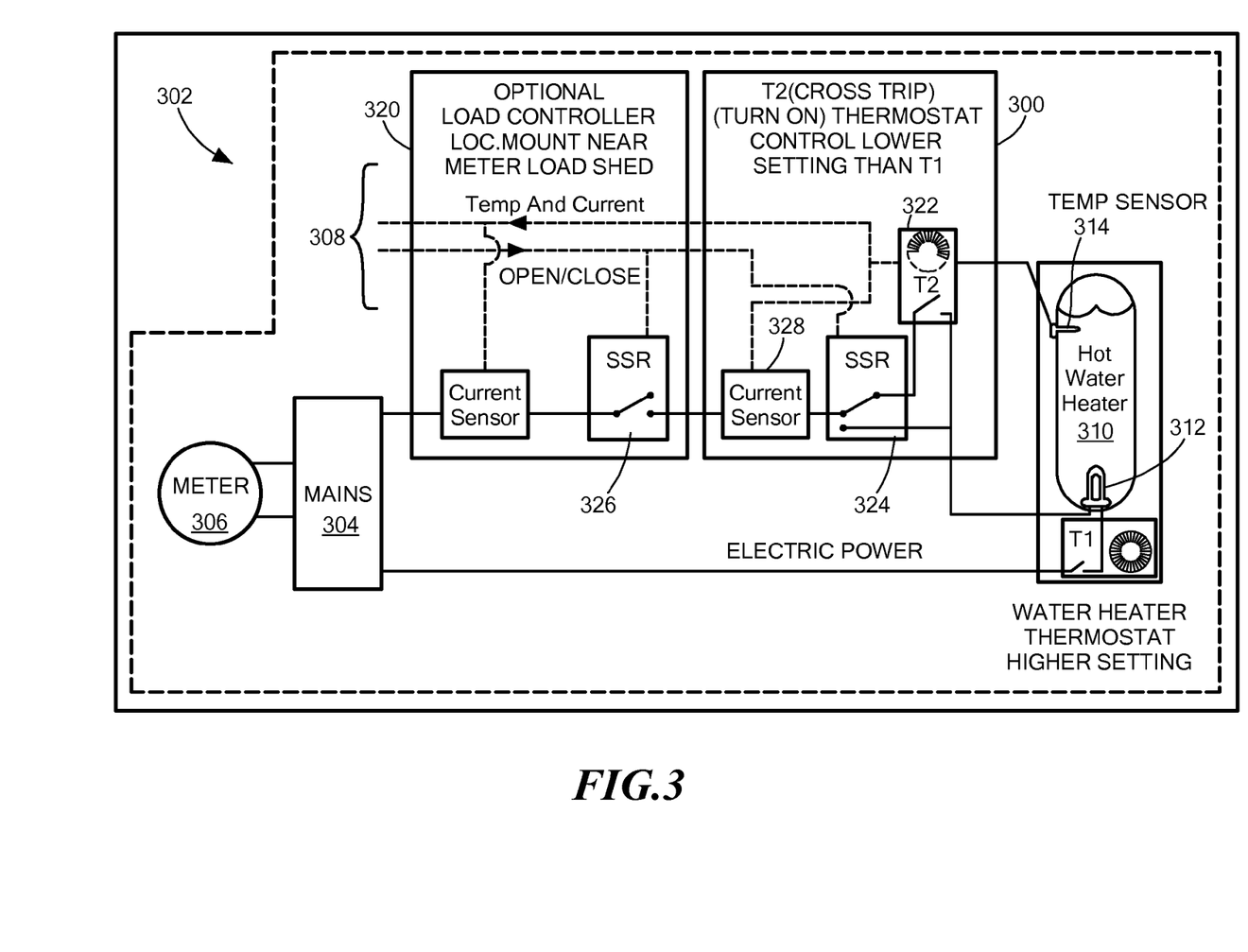
FIG. 3 is a diagrammatic representation of a centrally controlled method and device located at a load, in accordance with an embodiment of the present invention. Note that in the embodiment depicted, a water heater provides thermal inertia for the system.
Figure 4:
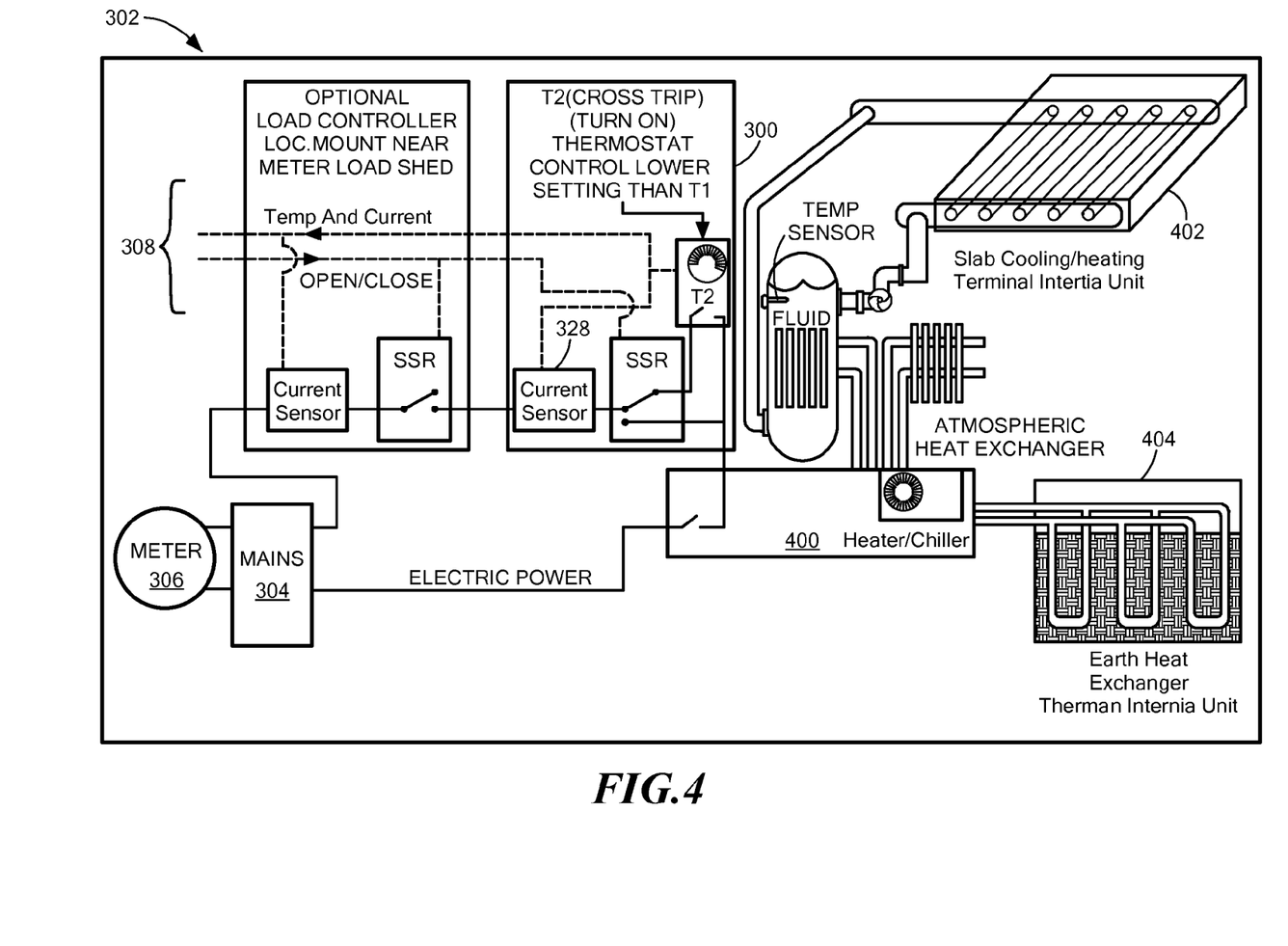
FIG. 4 is a further diagrammatic representation of a centrally controlled method and device located at a load, in accordance with an embodiment of the present invention. In the depicted embodiment depicted, appliances provide thermal inertia for the system, in accordance with an embodiment of the present invention.

FIG. 4 shows the load control circuit 302 as in the embodiment of FIG. 3, now applied to the generation of hot or cold water in heater/chiller 400 for storage of a thermal reservoir (hot or cold) in the ground 404 or in a slab heating or cooling thermal inertial unit 402. Another load may serve particularly effectively as an energy reservoir is an electric vehicle whose battery may be charged during periods of ample VG generating capacity on the grid, and may deliver power back to the grid if the availability or displacement of costly generation fuel sources makes such delivery favorable.

Stabilization of Intrazonal Power Flows

Figure 5A:
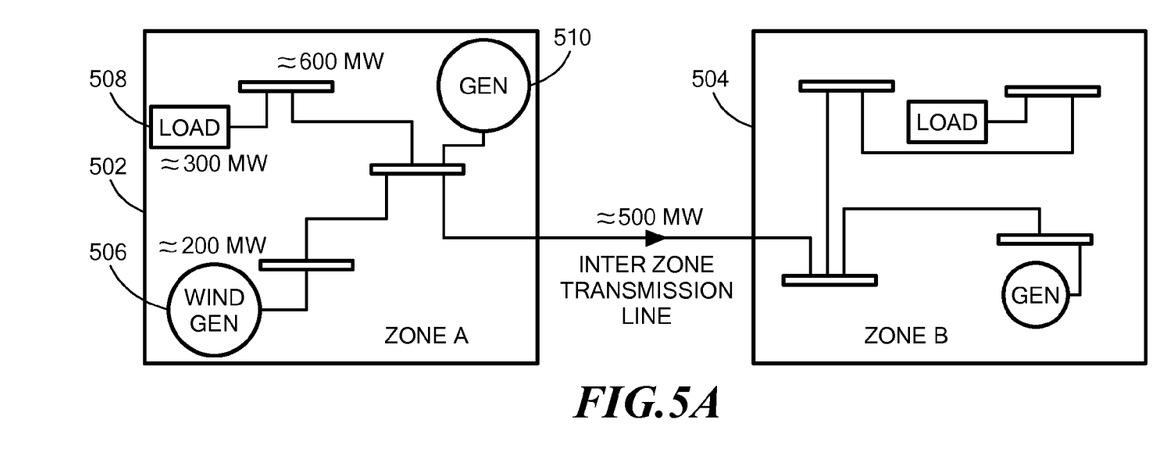
FIGS. 5A and 5B illustrate the intrazonal regulation of load to stabilize interzonal power flow, in accordance with an embodiment of the present invention.
Figure 5B:
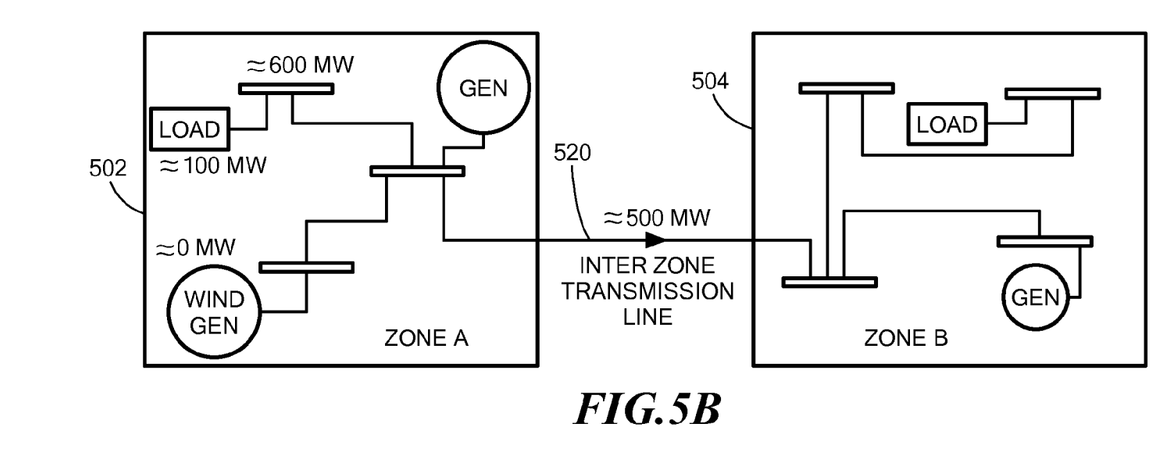

In accordance with certain embodiments of the invention, described now with reference to FIGS. 5A and 5B, central controller 120 (shown in FIG. 1) serves for dynamically scheduling and balancing uncertain (e.g., weather-based wind and solar) generation to new fuel displacing heating and cooling customer loads along with supporting generation with an unstable power system (e.g., Cross Tripping and Load Shed). For example, if a major load on the power system is suddenly lost, it may become necessary to shed massive amounts of power to prevent damage to the system. The invention loads are comprised of, but not limited to, an optimum mix of both storage and interruptible HVAC, water heating, deferrable ice storage, deferrable slab heating and dual fuel interruptible loads. These loads may be aggregated to serve as a dynamic brake, absorbing large amounts of power on short call.

In FIG. 5A illustrates a scenario in which, within one power zone 502, Zone A, generating resources during one period of time include a wind generating capacity 506 of 200 MW and a generating capacity 510 powered by non-renewables of 600 MW. A load 508 of 300 MW leaves 500 MW delivered by interzone transmission line 520 to Zone B 504 to supplement the generating capacity of Zone B and satisfy demands of Zone B loads.

In the scenario of FIG. 5B, in the network identical to that of FIG. 5A, the volatile wind generating capacity 506 has been lost due to weather, or other, conditions. In order to achieve uninterrupted interzonal delivery of power from Zone A to Zone B and transparency to the fallout of Zone A volatile generating capacity, dynamic source/load matching, in accordance with the present invention, allows the Zone A load demand to be reduced to 100 MW, thereby insulating the interzonal virtual capacity of 500 MW from interruption.

A uniquely advantageous aspect of the invention is that (unlike traditional utility load management) the control goal is for the intrazonal balance of uncertain generation and new SI loads to remain as transparent as possible to the utility system in the background transporting firm generation to firm customer load thus reducing the interzonal transmission loading effect of new loads coming online.

In accordance with embodiments of the present invention, interzonal power flows may be regulated, along the lines discussed herein, either to achieve balance or to skew the balance, as desirable to system operators.

A unique aspect of the invention is that the control goal is per the intrazonal balance of uncertain generation and new SI loads to (unlike traditional utility load management) remain as transparent as possible to the utility system in the background transporting firm generation to firm customer load thus reducing the interzonal transmission loading as new loads come online.

Control Center 120 preferably implements dynamic source/load balancing algorithms on a cycle-by-cycle (defined as switching at frequencies consistent with industry standards) basis direct high speed switching of customer load to maintain the desired balance of generation and load. The control center control 120 inputs include real time and forecast generation levels as well as ambient temperature input from load centers thus able to predict real time and hour ahead or day ahead forecasted load.

The novel concept of a user-overridable low-cost local switching and monitoring device 300 allows thermal ice/heat storage and/or water heater storage customer equipment to be switched on per transmission grid input to the central controller 120 which may direct a group call as to number of megawatts (MW) and direct customer load to be switched onto, or off of, the grid.

In accordance with further embodiments of the present invention, reduction in $CO_2$ may be audited directly, and taken into account in dynamically allocating generation capacity such as by dynamically directing volatile generation (wind, solar) to HVAC to replace oil based heating at each customer based on a nominal quantity of $CO_2$ per gallon of fuel or per 1,000,000 BTU fuel use. Also dynamically schedule volatile generation for air conditioning (for production of ice) thus avoiding the $CO_2$ component in traditional utility generation. All in a manner which does not compound traditional generation to swing for volatile generation as it is dynamically matched to new fuel displacing load.

Figure 6:
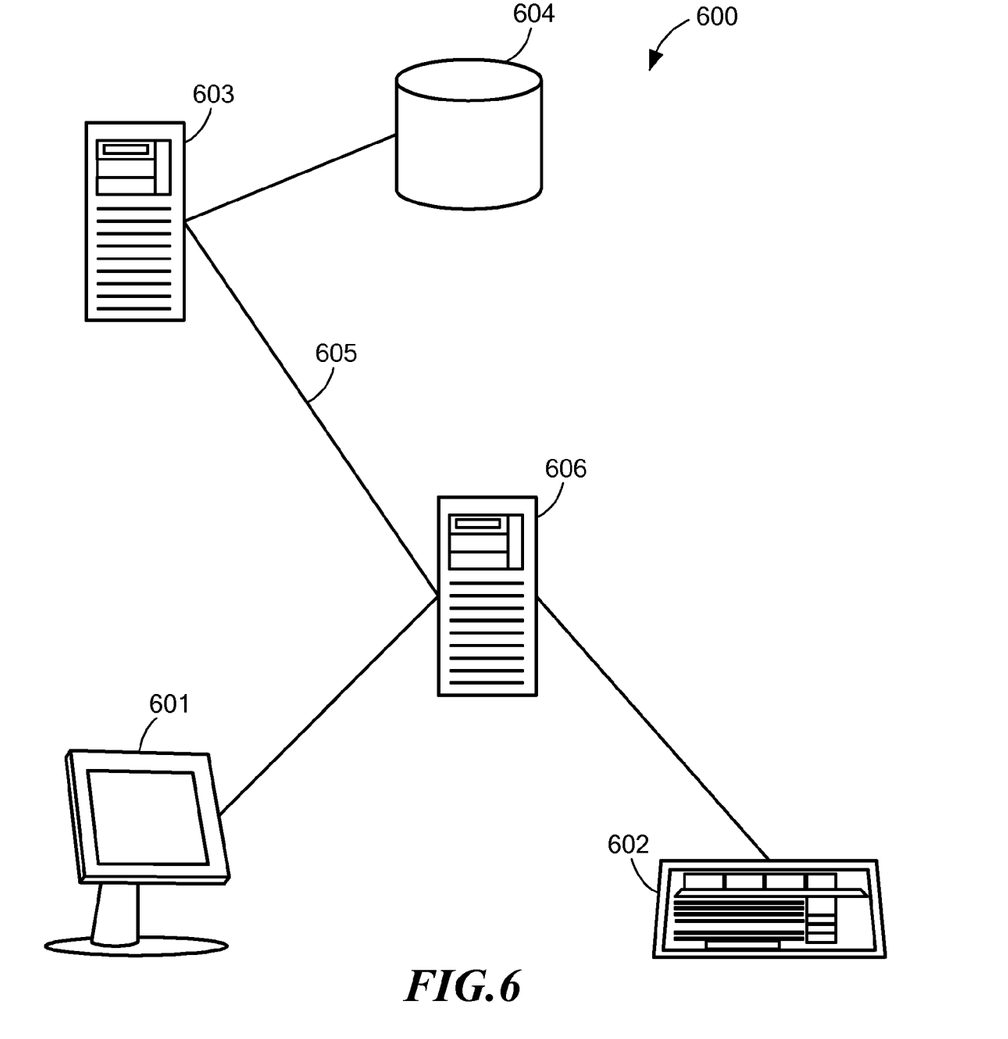
FIG. 6 schematically depicts one embodiment of a controller or processor system that may be used to implement aspects of the present invention.

Various aspects of the invention may also be implemented as specialized software executing in a general-purpose computer system 600 such as that shown in FIG. 6. The computer system 600 may include a database server 603 connected to one or more memory devices 604, such as a disk drive, memory, or other device for storing data. Memory 604 is typically used for storing programs and data during operation of the computer system 600. Components of computer system 600 may be coupled by an interconnection 605, which may include one or more busses (e.g., between components that are integrated within a same machine) and/or a network (e.g., between components that reside on separate discrete machines). The interconnection 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism).

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 6. Various aspects of the invention may be practiced on one or more computers having a different architecture or components than that shown in FIG. 6.

Computer system 600 may be a general-purpose computer system that is programmable using a high-level computer programming language. Computer system 600 may be also implemented using specially programmed, special purpose hardware. In computer system 600, servers 603 and 605 are typically implemented on one or more commercially available servers.

Processors 607 (or, as used interchangeably herein, "controllers") and operating systems employed in conjunction with servers 603 and 605 define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, or interpreted code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, while descriptions have been provided in terms of capturing facial movements, they are not limited to this context. The procedures are applicable to a wide variety of tracking problems.

Moreover, where examples presented herein involve specific combinations of method acts or system elements, it should be understood that those acts and those elements may be combined in other ways to accomplish the same objective of automatic capture of facial movements. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Additionally, single device features may fulfill the requirements of separately recited elements of a claim.

We claim:

1. A method for balancing and stabilizing an interzonal power transmission system with at least one set of interruptible, deferred, and daily deferred loads, the set of interruptible, deferred, and daily deferred loads including at least one thermal inertia unit and at least one set of sources within at least one power zone of a global power system, both the at least one set of interruptible, deferred, and daily deferred loads and the at least one set of sources being coupled to a power transmission system, the method comprising:
   a. providing a central controller for regulating energy delivery to the at least one set of loads over the power transmission system;
   b. providing the set of interruptible, deferred, and daily deferred loads, the set of interruptible, deferred and daily deferred loads Including at the least one thermal inertia unit with a dual fuel source;
   c. providing the dual source including loads to use electricity, primary fuels, and other nonrenewable and renewable non-electrical sources of energy;
   d. forecasting an energy demand for the at least one set of interruptible, deferred, and daily deferred loads over an interval of time, accounting for a status of the at least one thermal inertia unit;
   e. forecasting a renewable energy supply for at least one set of renewable energy generator units of the at least one set of sources;
   f. dynamically balancing the interzonal power transmission system by linking each of the at least one set of interruptible, deferred, and daily deferred loads with at least one of the at least one set of sources;
   g. synchronizing the anticipated energy demand for the at least one set of loads with delivery of energy by the at least one set of sources by commands delivered to a local switching and monitoring device coupled to the at least one thermal Inertia unit; and
   h. altering a traveling wave on a high voltage interzone transmission line between the at least one power zone and at least one additional power zone of the global power system coupled to the power transmission system by sending a control signal from the central controller to the local switching and monitoring device to cause the local switching and monitoring device to switch the at least one thermal Inertia unit on the power transmission system to dampen a magnitude of the traveling wave thereby acting as a dynamic brake to modify a disruption on the interzonal power transmission system caused by the traveling wave, wherein the traveling wave is created by a natural response of the at least one additional power zone or one or more control system dynamic responses of the at least one additional power zone.

2. A method in accordance with claim 1, further comprising:
   anticipating energy demand over a variable period of time accounting for the status of at least one associated energy reservoir.

3. A method in accordance with claim 2, wherein further providing a central controller for monitoring energy production from at least one renewable energy source over the power transmission system to allocate energy provided by multiple energy sources among multiple energy loads of varying kinds and demands.

4. A method in accordance with claim 1, wherein energy is delivered for storage at the at least one load in the set of interruptible, differed and daily differed loads in anticipation of a period of demand of at least one load in the set of interruptible, differed and daily differed loads.

5. A method in accordance with claim 1, wherein assessing energy demands includes calculating a heat load schedule based on anticipated ambient temperatures.

6. A method in accordance with claim 1, wherein assessing energy demands includes utilizing a forecast model.

7. A method in accordance with claim 6, wherein the forecast model includes estimates of utility pricing.

8. A method in accordance with claim 6 to reduce CO2 emissions from a plurality of fossil fueled generation sources and a plurality of previously fossil fueled loads the method comprising:
   Controlling an optimum mix of at least one load in the set of interruptible, differed and daily differed loads, wherein the set of interruptible, differed and daily differed loads comprising: HVAC, water heating, deferrable ice storage, deferrable slab heating and dual fueled interruptible loads wherein the optimal mix is aggregated to serve as a dynamic brake, absorbing large amounts of power on short call wherein the controlling the optimal mix comprising:
   delivering uninterrupted interzonal delivery of power from a first power system (502) with volatile generation to a second power system (504) and transparency to a fallout of the first power system's (502) volatile generating capacity across two zones wherein the delivering uninterrupted interzonal delivery of power comprising:
   dynamically matching at least the set of sources and one set of interruptible, deferred, and daily deferred loads with a forecast model, within the at least one power zone with volatile generation, wherein the forecast model comprises:
estimates of a plurality of utility pricing of cost of energy from a plurality of sources, estimates of a plurality of environmental $CO_2$ emission burdens, estimates of a plurality of weather conditions and estimates of a plurality of various global power system emergency conditions.

9. A method in accordance with claim 1, further comprising altering traveling wave speed on the global power system.

10. A method in accordance with, claim 1, further comprising altering traveling wave phase on the global power system.

11. A method in accordance with claim 1, further comprising altering traveling wave magnitude on the global power system.

12. A method in accordance with claim 1, further comprising interconnecting two separate power systems to form the global power system.

13. A system for delivering energy to a plurality of loads from a non-renewable energy source and a renewable energy source, the non-renewable and the renewable sources coupled to the plurality of loads through a global power transmission grid, the system comprising:
  a. central controller coupled to the plurality of loads, adapted to assess energy demands for each load of the plurality of loads on the global power transmission grid over an interval of time and to synchronize the energy demands with delivery of energy by the at least one renewable energy source, and
  b. a plurality of local switching and monitoring devices,
    each of the plurality of local switching and monitoring devices being coupled to at least one load of the plurality of loads for receiving switching commands from the central controller,
    wherein each of the plurality of loads is a thermal load,
    wherein each of the local switching and monitoring, devices is configured to receive a control signal from the central controller that causes each respective local switching and monitoring device to adjust an operating temperature of a respective load on the global power transmission grid by activating a relay to bypass regulation circuitry to inject more energy into the respective loads
    wherein the injection of more energy into each of the respective loads alters a traveling wave on the high voltage interzone transmission line between at least one power zone and at least one additional power zone of the global power transmission grid to dampen a magnitude of the traveling wave thereby acting as a dynamic brake to modify a disruption on the global power transmission grid caused by the traveling wave,
    wherein each of the respective loads is within the at least one power zone, and wherein the traveling wave is created by a natural response of the at least one additional power zone or one or more control system dynamic responses of the at least one additional power zone.

* * * * *